(12) United States Patent
Andersson et al.

(10) Patent No.: US 8,776,722 B2
(45) Date of Patent: Jul. 15, 2014

(54) METHOD AND APPARATUS FOR PROTECTING AN OPTICAL DETECTION DEVICE FROM CONTAMINATION

(75) Inventors: Jan-Erik Andersson, Tumba (SE); Anders Hallstrom, Vendelso (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 13/990,076

(22) PCT Filed: Dec. 20, 2011

(86) PCT No.: PCT/SE2011/051543
§ 371 (c)(1),
(2), (4) Date: May 29, 2013

(87) PCT Pub. No.: WO2012/087233
PCT Pub. Date: Jun. 28, 2012

(65) Prior Publication Data
US 2013/0247827 A1    Sep. 26, 2013

Related U.S. Application Data

(60) Provisional application No. 61/426,182, filed on Dec. 22, 2010.

(30) Foreign Application Priority Data

Dec. 22, 2010  (SE) ...................................... 1051370

(51) Int. Cl.
*A01J 5/01*  (2006.01)
(52) U.S. Cl.
USPC .................... 119/14.02; 119/14.18; 119/14.08
(58) Field of Classification Search
USPC ................................. 119/14.02, 14.08, 14.18
See application file for complete search history.

(56) References Cited

U.S. PATENT DOCUMENTS

| | | | |
|---|---|---|---|
| 4,497,550 | A | 2/1985 | Ouchi et al. |
| 5,708,859 | A | 1/1998 | Tajima et al. |

(Continued)

FOREIGN PATENT DOCUMENTS

| | | |
|---|---|---|
| DE | 196 52 107 A1 | 6/1998 |
| DE | 102 25 151 A1 | 12/2003 |

(Continued)

OTHER PUBLICATIONS

International-Type Search Report, dated Jun. 8, 2011, from corresponding PCT application.

(Continued)

*Primary Examiner* — Yvonne Abbott
(74) *Attorney, Agent, or Firm* — Young & Thompson (57) ABSTRACT

A milking system includes a milking robot with a robot arm for applying teat cups to the teats of an animal, an optical detector (40) for detecting radiation emitted and/or reflected from the animal and a controller. The detector has a housing (410) with a window (420) and a detecting element (430) enclosed in the housing that is sensitive to the emitted or reflected radiation passing through the window. In order to prevent contamination from impacting on the detector window, an airflow arrangement is provided that can be connected to a source of pressurized air and has at least one aperture (411) disposed adjacent the detector window (420) for generating a curtain of air that flows parallel with the surface of the window. The controller controls the generation of the air curtain to coincide with the start of at least one further operation controlled by the controller.

21 Claims, 5 Drawing Sheets

(56) References Cited

U.S. PATENT DOCUMENTS

| | | | |
|---|---|---|---|
| 5,784,994 A | 7/1998 | Van Der Lely | |
| 5,879,626 A | 3/1999 | Watterson et al. | |
| 6,118,118 A * | 9/2000 | van der Lely et al. | 250/221 |
| 6,234,109 B1 * | 5/2001 | Andersson et al. | 119/14.08 |
| 6,341,575 B1 * | 1/2002 | Forsen | 119/14.08 |
| 6,425,346 B1 * | 7/2002 | Birk | 119/14.18 |
| 6,443,094 B1 * | 9/2002 | DeWaard | 119/14.18 |
| 6,527,871 B1 | 3/2003 | Hanson et al. | |
| 2003/0155001 A1 | 8/2003 | Hoetzer et al. | |

FOREIGN PATENT DOCUMENTS

| | | |
|---|---|---|
| EP | 0 688 498 A2 | 12/1995 |
| EP | 1 120 034 A2 | 8/2001 |
| GB | 2 325 300 A | 11/1998 |
| RU | 1777728 A1 | 11/1992 |
| RU | 2 244 417 C2 | 1/2005 |
| RU | 79 191 U1 | 12/2008 |
| RU | 2 374 593 C2 | 11/2009 |
| WO | 98/45808 A1 | 10/1998 |
| WO | 01/19172 A1 | 3/2001 |

OTHER PUBLICATIONS

International Search Report, dated Apr. 27, 2012, from corresponding PCT application.

Supplementary International Search Report, dated Mar. 28, 2013, from corresponding PCT application.

* cited by examiner

METHOD AND APPARATUS FOR PROTECTING AN OPTICAL DETECTION DEVICE FROM CONTAMINATION

TECHNICAL FIELD

The present invention relates to optical detectors for use in contaminated environments and has particular relevance to optical detectors used in automatic or semiautomatic milking systems, for example, for determining the position of an animal's teats.

BACKGROUND

An optical detection arrangement, such as is commonly used in automatic milking systems, typically includes a detector in the form of a diode detector or CCD array camera for detecting radiation that is emitted or reflected from an object of interest, and using the detected radiation to determine the distance between the object and the detector. Some systems may also have a radiation source, for example, a laser, used to illuminate objects of interest with suitable radiation. In most cases, the radiation detector and source, if present, are arranged in a housing behind a screen or window that protects the camera or diode from surrounding pollution. The window may be made of glass or other suitably transparent material through which visible light or other radiation can pass substantially without attenuation. In order for an optical detection system of this kind to operate reliably, it is important that the transmission of radiation through the window is not blocked by deposits such as dirt, dust or water. Deposits of any kind reduce the amount of optical radiation that can reach the detector and, in systems containing a source of radiation for illuminating an object, may also prevent an object from being illuminated adequately.

A particular challenge in a milking parlour is the amount of dirt and liquid that is present around the system. All equipment that comes into contact with the animals must be kept clean. Generally, this is achieved by subjecting the relevant elements of the milking system, such as teat cups, teat cleaning devices and even parts of the robot arm to a periodic wash with a cleaning or disinfecting liquid or at least with water. In addition, when an animal is to be milked, the teats must be washed and typically also disinfected after milking. During this process, droplets of liquid can become airborne and thus be likely to settle on the detector window. Milk may also leak from the teats of an animal both prior to and after milking. Since the optical detectors are often positioned close to the teats of an animal, milk can also land on the detector window. Additionally, the floor of the milking parlour is often wet as a result of the various cleaning operations, so that droplets can be thrown upwards by the movement of an animal's feet.

Existing systems have cleaning devices either provided separately from the detectors or connected to the detector window for washing or wiping the window surface and possibly drying the protective window with a blast of air. For example, EP-A-0688498 describes a cylindrical optical detector used in a milking arrangement that has a sliding cover adapted to move over a window. The cover is equipped with a sponge that is wetted by a cleaning liquid. As the cover slides over the window, the window is wiped by the sponge. U.S. Pat. No. 4,843,561 describes an agricultural harvester with an imaging devices in the form of cameras. These cameras are cleaned by means of a sprayer that sprays cleaning solution and wiper blades that automatically wipe a glass cover that protects the camera. A problem with such arrangements is that cleaning takes a certain time to accomplish and during this time the optical detector is necessarily inoperative, as the application of any form of liquid onto the surface will impede the correct operation of the detector.

U.S. Pat. No. 4,240,691 proposes a system for protecting television cameras that are used for surveillance. This essentially consists of a device that is mounted on the front of the camera objective and is shaped to generate air channels through which pressurised air is piped permanently. The protective device is designed to generate a laminate air flow across the surface of the camera objective so that any dust in the air is carried away from the surface of the objective before it can land on the glass. The cameras equipped with this device are operated continuously and can be unattended for many days, weeks or even months. The permanent air flow is intended to ensure that the cameras remain substantially free of dust. However, the need for a continuous pressurised air flow makes the arrangement expensive. Moreover, while this device it is effective for preventing airborne dust or small dirt particles from obscuring the camera objective in a location that is not heavily contaminated, for example fixed to a wall of a building well above ground level, such an arrangement would be less effective when located close to an inherently dirty floor, as the forced air flow would generate a turbulent flow that could throw up dust, particles, mud and liquid from the floor into the air. This would not only obscure the objective, but could also damage it, as any abrasive particles in the resultant dust cloud could scratch the camera over time. Such an arrangement is thus inherently unsuitable for use close to the floor of barns or milking parlours, for example, on a camera located roughly at the level of a cow's teats.

In view of the drawbacks of the above arrangements and methods, it is an object of the present invention to reduce the inoperative time due to cleaning of a camera that is arranged for use in a dirty environment, while maintaining reliable and effective operation by ensuring that the camera window remains clean.

SUMMARY

In accordance with the present invention, this object is achieved in a milking system having a milking robot with at least one robot arm for applying teat cups to the teats of an animal, an optical detector for detecting radiation emitted and/or reflected by at least part of an animal, the detector having a housing with a window that is substantially transparent to said radiation and a detecting element that is enclosed within said housing and receives the radiation through the window, wherein the optical detector is adapted to be moved to a position under an animal for detecting the position of the teats of the animal, and a controller for controlling the operation of the robot arm and the detector. The detector includes an airflow arrangement adapted to be connected to a source of pressurised air and having at least one aperture disposed adjacent the detector window for generating a curtain of air that flows substantially parallel with the surface of the window, wherein the controller is adapted to control the application of pressurised air to the at least one aperture to generate the air curtain at the start of, or shortly before the start of at least one further operation controlled by the controller.

By generating the air curtain to coincide with another operation controlled by the controller, and ideally with the start of this other operation, it is ensured that the air curtain is in place only when there is a risk of contamination of the window as a result of this other operation. This not only reduces the operating cost of the device, but it also limits the risk of unnecessary air turbulence close to the stall floor and thus also the attendant airborne contamination that could damage both the detector and other equipment in the milking stall.

Once this other operation is terminated, the controller can stop generating the air curtain by ceasing the application of pressurised air to the aperture or apertures. Alternatively, the air curtain may be retained in place until several such operations have been performed in series and it is considered beneficial to protect the detector window during and between these operations.

Preferably, the at least one further operation controlled by the controller includes the positioning of said detector under an animal. When the detector is moved close to the teats of an animal, for example, in order to detect the teats and determine their position prior to cleaning or milking, there is a risk that milk droplets may land on the detector window, as in some animals, milk let-down is triggered simply by the act of entering the milk box and in most cases will have started when the teats have been washed. In addition when the detector is located under an animal, there is a higher risk of dust or mud falling from the animal onto the detector window. It may thus advantageous to keep the air curtain in place until the detector has been moved away from the animal.

Alternatively, or in addition, the at least one further operation controlled by the controller includes the operation of the detector for detecting radiation. In some cases it may be sufficient simply to generate the air curtain to coincide with the start of operation of the detector.

When any wet operation is carried out by the milking system it is clear that the detector window is more at risk of contamination. Accordingly, when the milking system includes a washing device for cleaning the teats of an animal it can also be particularly advantageous when the at least one operation controlled by the controller consists of cleaning the teats of the animal with the washing device. Similarly, when the milking system includes a teat treatment device for applying liquid treatment to the teats of an animal, the at least one further operation controlled by the controller preferably consists of controlling the teat treatment device to apply a liquid treatment to the teats of the animal.

Preferably, the aperture or apertures are arranged relative to the window such that upon application of pressurised air, air flows substantially downwards from the aperture or apertures. This ensures that droplets of liquid, such as water or milk, many of which will anyway be falling downwardly under the force of gravity will simply be swept along by the air curtain. However, it may be advantageous to arrange the aperture or apertures relative to the window such that upon application of pressurised air, air flows across the window in a direction that is substantially perpendicular to a downwards direction, in other words, from one lateral side of the window to the other. This reduces the turbulence generated at floor level and, hence, reduces the risk of dust being thrown into the air to obscure the detector field.

The detector is preferably mounted on a robot arm. This may be the same robot arm used for applying teat cups to the teats of an animal, or a separate robot arm. In this way, the actuation of the air curtain can be effected in conjunction with the positioning of the robot arm under control of the control means, for example, when the robot arm is adjacent, or has been moved to a position adjacent the washing device prior to washing.

In order to reduce the risk of damage by an animal, the air flow arrangement is preferably at least partially integrated in the detector housing with the aperture or apertures disposed at the exterior of the housing on one side of the window and communicating with a duct system that is arranged in or on the housing and connectible to the pressurised air source. In a particularly advantageous embodiment, the duct system is used to supply cleaning liquid for washing the window when the detector is not in operation. To this end the duct system is further adapted to be connected to a source of cleaning liquid, wherein the controller controls the application of a cleaning liquid to force cleaning liquid out through the aperture or apertures to clean the window. This may be followed by the connection of the duct system to the pressurised air source to generate the air curtain in order to dry the window.

The invention also resides in a method for preventing contamination of an optical detector used to determine the position of teats of a dairy animal, wherein the detector is comprised in a milking system having a milking robot with at least one robot arm for applying teat cups to the teats of an animal and wherein detector has a housing, a detecting element enclosed within the housing and a window that forms part of the housing and is of a material that is substantially transparent to radiation detected by the detecting element. The detector further includes an airflow arrangement adapted to be connected to a source of pressurised air and having at least one aperture disposed adjacent the detector window. The method includes the steps of actuating the application or pressurised air to the at least one aperture to generate an air curtain at the start of, or shortly before the start of, at least one further operation performed by the milking system.

Preferably, the step of generating the air curtain to coincide with at least one further operation includes moving the detector to a position under an animal to be milked and generating the air curtain to coincide with the movement of said detector.

The air curtain is advantageously turned off by halting the application of pressurised air to the one or more apertures while the detector is moved away from a position under the animal or at the end of this movement.

In alternative embodiments, the step of generating the air curtain to coincide with at least one further operation includes generating the air curtain to coincide with spraying treatment liquid towards the teats of the animal, with the cleaning of the teats of the animal using a teat cleaning device and/or with the application of teat cups to the teats of the animal.

In an arrangement wherein the airflow arrangement is adapted to be connected to a source of cleaning liquid, the method further includes the step of controlling the application of cleaning fluid to the at least one aperture to effect the cleaning of the window.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
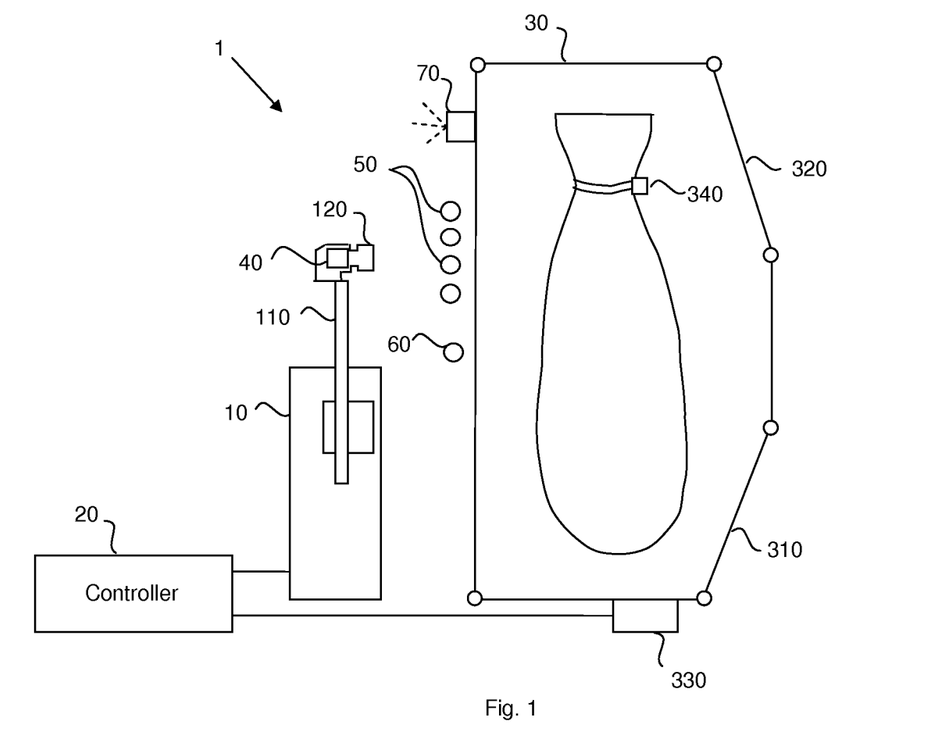
FIG. 1 schematically illustrates a milking stall with an automatic milking system in accordance with the present arrangement, FIG. 2 schematically illustrate a detector in accordance with the present invention.

FIG. 1 shows an automatic milking system, which includes a milk box 30 for retaining an animal to be milked and a milking robot 1 disposed to one side of the milk box 30. The milk box 30 includes an entrance gate 310 and an exit gate 320. An identification device 330 is mounted on or near to the milk box 30 close to the entrance gate 310. This device 330 detects the unique identification of an animal standing before the milk box by detecting or interrogating a transponder 340, that is carried by the animal, for example on a collar, and holds a unique identification number or code assigned to the animal. The control of these gates will be described in more detail below. The milking robot 1 includes a robot arm construction 10 as well as a number of other components not shown in the figure but conventionally present in this type of arrangement. These components typically include, but are not limited to, milk and pulsation lines and associated elements of the milk and vacuum circuits, such as collecting jars and regulator valves, flow and vacuum sensors and physiological sensors, which may include conductivity and temperature sensors, among others. A set of four teat cups 50 connected to milk lines (not shown) are provided in a position of rest arranged in a magazine located beside the robot arm construction 10 within easy reach of the same. A washing cup 60 for washing an animal's teats one by one is also shown in its rest position arranged beside the robot arm construction. The washing cup 60 preferably includes a spray nozzle in its interior through which cleaning and/or rinsing liquid can be applied to an animal's teats. Alternatively, the cleaning and/or rinsing liquid is not sprayed within the teat cup, but forced through one or more outlets at least some of which are disposed towards the upper rim of the washing cup 60, so that the liquid can run down and around the teat in the washing cup, possibly acting in conjunction with some mechanical means such as brushes or sponges. While only one washing cup 60 is illustrated, it will be understood by those skilled in the art that two or more washing cups 60 may be provided to wash more than one teat simultaneously. The robot arm construction 10 includes a robot arm 110 that is movable vertically and horizontally and capable of rotating about two axes to enable it to be moved into one or more precise positions under an animal present in the milk box 30 and withdrawn to the side of the milk box 30 in the illustrated position when not used for milking. The robot arm 110 carriers a gripper 120 at its end which, in the illustrated embodiment, comprises an electromagnet that can be energised to pick up a teat cup 50 or the cleaning cup 60 and de-energised to release the teat and cleaning cups 50, 60. To this end, the teat cups 50 and cleaning cups 60 are provided with an outer casing that is magnetic or is provided with a strip of magnetic material. It will be understood, however, that other systems could replace the electromagnet. For example, opening and closing mechanical elements for physically gripping the teat cups and cleaning cups, or a cup-like element for cradling each teat cup could be employed equally well here.

At the end of the robot arm 110, slightly behind and above the gripper 120, there is arranged an optical detector 40 for detecting and determining the position of the teats of an animal to be milked. In an alternative embodiment, the detector 40 can be arranged on a separate robot arm that is moved independently of the robot arm 110 carrying teat cups. This detector will be described in more detail below.

Also located at the side of the milk box 30 is a cleaning device 70 for cleaning the gripper 120. This device has one or more spray nozzles connected to a source of cleaning liquid and/or water and possibly also a disinfectant. The location of this device 70 is such that the gripper 120 can be moved to a position directly in front of the spray nozzles and sprayed to remove dust and dirt. A number of other cleaning devices are also provided, although these are not illustrated in FIG. 1. These include devices for cleaning the teat cups 50 and cleaning cup 60. It is paramount in such an arrangement that any component of the device that is likely to come into contact with the animal, either by connection to a teat or simply though brushing against the animal's udder, legs or flanks as the device or the animal moves, can be cleaned thoroughly and possibly also disinfected to reduce the risk of cross-contamination between animals.

A controller, generally indicated by a black box 20, controls the operation of the milking robot. This includes the functions of the robot arm 110, the detector 40, the application of a vacuum to the milk lines and pulsation lines for connection and disconnection of the cleaning cup 60 and teat cups 50 and for milking, the supply of cleaning and rinsing fluid, the monitoring of the vacuum and milk flow by means of appropriate sensors and monitoring of the milk quality and health of the cow by means of physiological sensors. The controller 20 may also store information concerning each of the animals served by the milking system and use this information to regulate access to and through the milk box 30 by controlling the identification device 330 and the operation of the entrance and exit gates 310, 320. The controller 20 is preferably embodied by a computer with associated memory but may be constituted by several computers linked together either by wired or wireless connections or via an external network.

Figure 2:
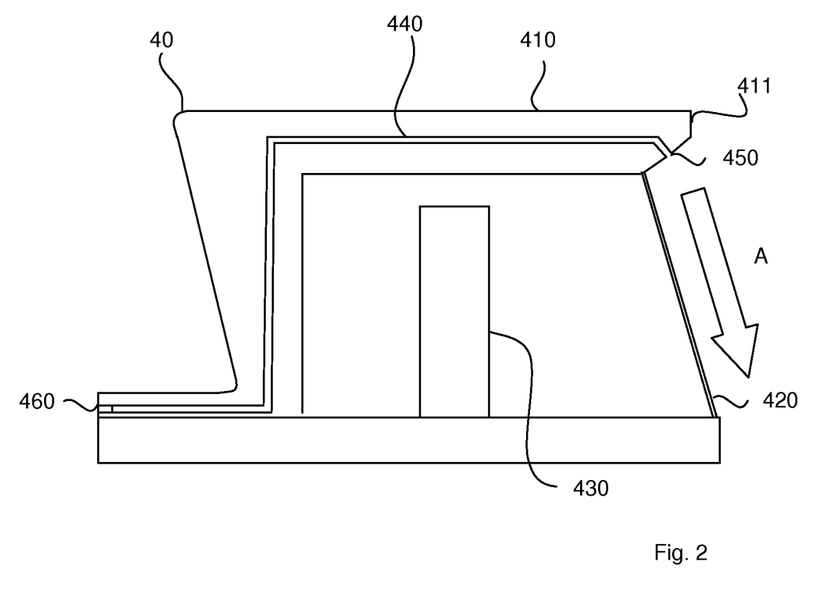

The detector 40 is illustrated schematically in more detail in FIG. 2, which shows a partial cross-sectional view. The detector 40 is a box-like structure of substantially rectangular cross-section. The top surface and four side surfaces of the detector 40 are constituted by a housing 410. The housing 410 includes a window 420 in one of the side surfaces. The window 420 is translucent and substantially transparent to the radiation detected by the detector 40. Suitable materials for the window 420 include glasses and plastics. The remaining parts of the housing 410 are opaque to the radiation in question. Behind the window 420 within the housing 410 there is located a detecting element 430, which may include one or more photo diodes or a CCD array or camera. The detecting element 430 is sensitive to a specific frequency or frequency band of radiation emitted or reflected from objects located in front of the window 420. The detecting element 430 may be sensitive to visible light, however, preferably it is sensitive to infrared radiation. Additionally, there may be provided a light source (not illustrated), such as a laser source for emitting radiation of the required frequency for illuminating the objects to be detected. The top surface of housing 410 projects beyond the window to form a lip 411. This lip 411 protects the window surface from dirt falling from above and also prevents the window from coming into contact with any part of the animal, specifically the udder and teats of an animal. Although not illustrated in the figure, the side walls of the housing adjacent the window 420 preferably also extend outwardly beyond the surface of the window to provide additional lateral protection from damage and contamination. Moreover, and in accordance with the present invention, the housing 410 is provided with a conduit system 440 extending from a connector 460 located outside the housing at the rear of the detector 40 through the housing 410 to the front side of the detector and opening into one or more apertures 450 arranged in the lower surface of the overhang 411 of the upper side of the housing 410. The connector 460 is configured in such a way that is may be connected to a source of pressurised air or to a cleaning liquid source. The aperture, or series of apertures, 450 extends over the length of the window and is arranged in such a way as to provide a substantially uniform, planar air flow over the whole surface of the window 420 as indicated by arrow A when pressurised air is supplied via connector 460. The aperture or apertures 450 may be elongate or substantially circular, depending on how many are provided in the overhang. 411. In essence, this planar air flow is an air curtain formed to lie essentially parallel with the window surface and designed to prevent airborne contaminants, such as dust and, more particularly, moisture, from landing on the window and obscuring the transmission of radiation to the detecting element 430 and/or from the light source, if present. In the illustrated embodiment, the apertures 450 are all disposed on the upper lip 411 of the housing to generate a substantially downwardly directed air curtain. However, in order to reduce turbulence at floor level, it may be preferable to dispose the apertures to one side of the window 420, but likewise in a protruding portion of the housing 410 such that the plane of air flow is always substantially parallel to the window surface 420. Whether the air flow is lateral or substantially vertical, the side wall of the housing 410 lying opposite the aperture or apertures 411 can be shaped to reduce air turbulence, which may break up the planar flow.

The actuation of pressurised air to the conduit system 440 is controlled by the controller 20. Because the use of pressurised air is relatively costly and a milk box 30 may be operating round the clock with only brief intervals reserved for cleaning and maintenance, it would be prohibitively expensive to operate the air curtain at all times. Moreover, operating the air curtain at all times has been found to reduce the reliability of the detector 40 as it has the tendency of stirring up dirt and dust lying on the floor and throwing it into the air so obscuring the space between the detector 40 and an object to be detected. This is particularly problematic in barns where sand is used on the floor of the area around the milk box, as the sand cloud generated by the air curtain is highly abrasive and in addition to permanently damaging the window surface 420 will be harmful to all the equipment present in and around the milk box 30. However, it may not be desirable to operate the air curtain only when the detector 40 is in operation. The reason for this is that the detector window 420 is constantly exposed to contamination, but the air curtain is not effective for removing dirt or moisture already deposited on the detector window 420, but is primarily for preventing deposits from forming. It is thus advantageous that the air curtain is actuated only at times when it can effectively reduce the risk of contamination of the window 420 without increasing airborne dust. To this end, the air curtain is established by the controller only when another operation controlled by the controller 20 is being performed. Ideally the air curtain is established at the start or shortly before the start of the other operation to ensure that it is in place and effective when the risk of contamination increases with the other operation. In general, the detector window 420 is at risk of contamination when it is close to the animal, in particular under an animal or close to the animal's udder and teats, when dust, mud or milk could impinge on the window, or when operations are underway that generate additional airborne contamination, such as washing procedures. In particular, there is a risk that milk may drip or spray onto the detector window 420 when the detector is in a position under the teats of an animal prior to or even after milking. Since the milk let-down is often triggered as soon as an animal enters the milk box, if not before, milk may start to flow before cleaning of the teats, i.e. before the teat position has been determined using the detector 40 and the cleaning cup 60 has been attached to each teat. Also during cleaning of each teat, the gripper 120 of the robot arm 110, and hence also the detector 40, will pass under the other teats and so be at risk of being sprayed with milk. The same is true during the detection of the teat position and attaching of teat cups 50 for milking. It will be appreciated that operation of the detector 40 is not affected by the presence of the air curtain or even by the actuation of the air curtain. Consequently, the air curtain may be actuated before the detector 40 is in operation or while the detector 40 is in operation. The operation of the air curtain will be described in more detail below with reference to the flow diagram in FIG. 3 and the various processes depicted schematically in FIGS. 4a to 4d, all of which can require the operation of the air curtain in accordance with the present invention.

Figure 3:
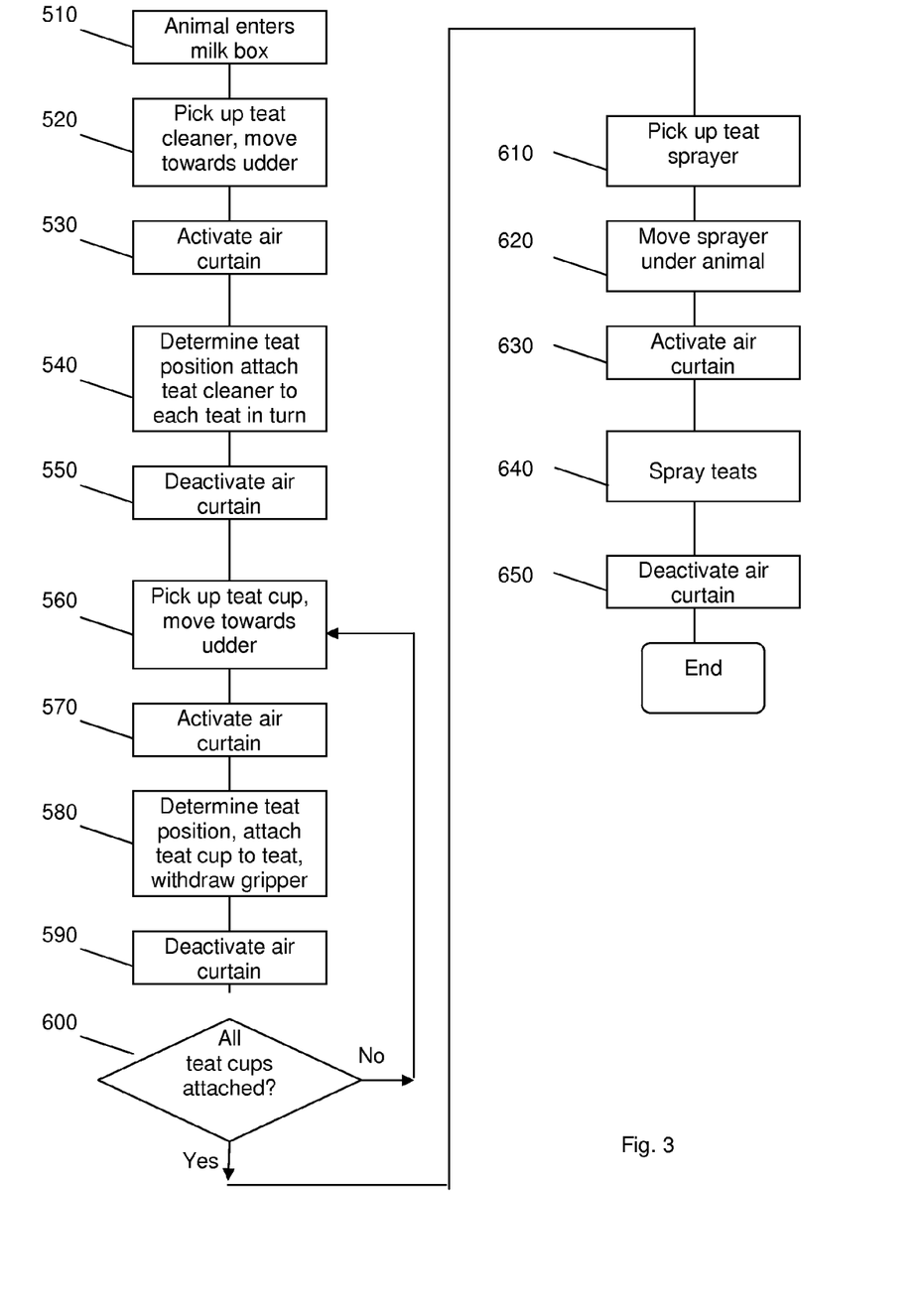
FIG. 3 is a flow diagram illustrating the control of the air curtain over the detector window in accordance with the present invention, and FIGS. 4a to 4d schematically illustrate four situations in which the detector air curtain may be actuated in accordance with the present invention.
Figure 4A:
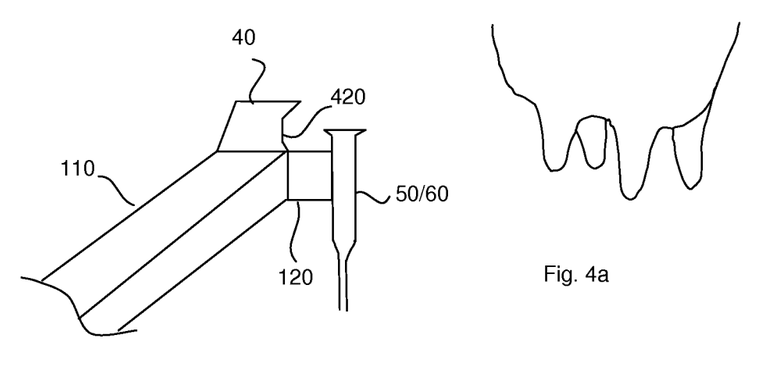
Figure 4B:
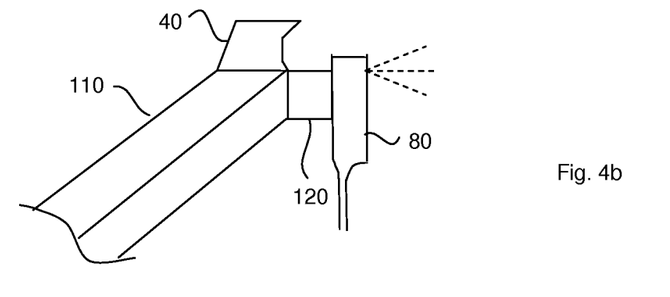

The flow diagram of FIG. 3 starts with step 510 when an animal has entered the milk box 30. Since the controller 20 identifies an animal at the entrance to the milk box 30 and allows access to the milk box only if the animal is due to be milked based on stored data from previous milking runs, the presence of the animal means that it is ready for milking. Consequently, at step 520, the controller 20 controls the robot arm construction 10 to pick up a teat cleaning cup 60 using the gripper 120 and move this toward the animal's udder. At this point, the air curtain is actuated to protect the detector window 420 as shown at step 530. This situation is shown in FIG. 4a, which depicts an end portion of the robot arm 110 carrying the gripper 120 and detector 40, with the gripper 120 holding a cleaning cup 60, approaching the teats of an animal. The position of the teats is then determined using the optical image data obtained using the detector, and the robot arm 110 is moved towards a first identified teat and the cleaning cup 60 applied, whereafter cleaning is effected as indicated at step 540. This process is repeated for the other teats. Throughout this procedure, the air curtain is maintained over the detector window 420, which ensures that dust or dirt or any droplets of milk or cleaning liquid are swept along by the curtain before reaching the window 420, so maintaining the field of view of the detector 40 clear and assuring the uninterrupted operation of the detector 40. Once the teat cleaning has been completed and the robot arm 110 moved away from under the animal's udder, the air curtain is deactivated as shown at step 550. The robot arm 110 is then moved to pick up a first teat cup 50 and then moved towards the animal's udder once again as shown in step 560. At this point, the air curtain is actuated once again by the controller 20 as shown in step 570. This situation is also illustrated by FIG. 4a, except that here the gripper 120 holds a teat cup 50 rather than a cleaning cup 60. The position of the first teat is then detected and the first teat cup 50 attached to this teat as shown at step 580, after which the robot arm is withdrawn from under the animal's udder. At this point, the air curtain is deactivated as indicated at step 590. This process (steps 560 through to 590) is repeated for each further teat until all the teat cups 50 are attached to teats as indicated at step 600. This may complete the milking procedure for an animal, but it is also possible to perform a further treatment to the teats as indicated by the steps 610 to 650 and illustrated in FIG. 4b. Turning firstly to FIG. 4b there is shown the end of the robot arm 110 with the gripper 120, which holds a disinfectant sprayer 80. This is attached to a source of conventionally employed liquid disinfectant, which is used to treat an animal's teats after milking in order to prevent infection. The procedure starts at step 610 with the robot arm 110 being controlled by controller 20 to pick up the disinfectant sprayer 80 from its position of rest that is preferably beside the milk box 30. It should be noted that the detector 40 need not be operated during this procedure, as the robot arm can be moved to a position that is roughly in front of the udder using previously stored data relating to the dimensions of the animal present. However, since the detector 40 is required for detecting the teat of the following cow, and this cow may enter the milk box as soon as it is vacated, actuating the air curtain precludes the need for additional cleaning of the detector window 420. At step 620, the robot arm 110 is moved towards the animal's udder and at step 630 the air curtain is actuated by controller 20 to protect the detector window 420. At step 640, the disinfectant sprayer 80 is activated to spray disinfectant onto the animal's teats. When this has finished, the air curtain is deactivated at step 650 and the robot arm 110 withdrawn to the side of the milk box 30 to return the disinfectant sprayer 80 to its position of rest. It will be appreciated that the air curtain can be generated at the start or shortly before the start of movement of the detector under an animal, or alternatively, at the start or shortly before the start of one of the other operations being performed, such as detecting the teat positions, washing the teats, applying an after treatment spray to the teats. In addition, the air curtain can be turned off after each individual operation, if the risk of contamination is small, or alternatively left in place until a series of operations have been completed on the animal.

Figure 4C:
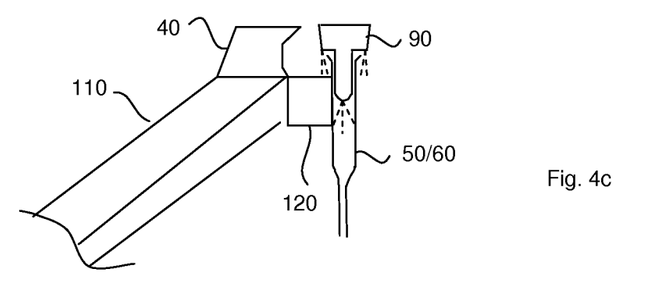
Figure 4D:
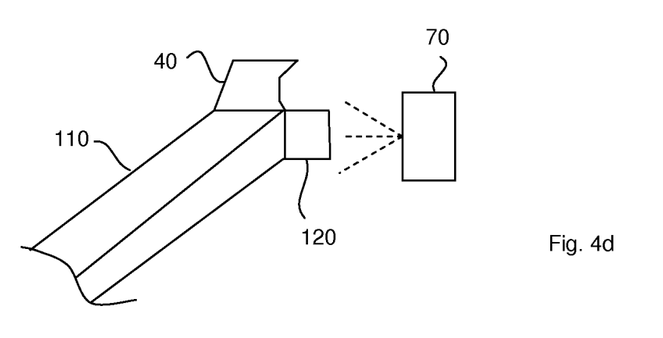

Two further situations are illustrated in FIGS. 4c and 4d during which the activation of the air curtain over the detector window 420 may be actuated by controller 20. In both cases, the detector 40 need not be in operation as the required position of the robot arm is known in advance, and not dependent on a moving object. The first situation, illustrated in FIG. 4c, is cleaning of a teat cup 50 or cleaning cup 60. In the illustrated example, this is performed using a nozzle assembly 90 that is arranged close to the magazine holding the teat cups 50 and cleaning cup 60 in the position of rest. In order to clean a teat cup 50 or cleaning cup 60, the cup is picked up by the gripper of the robot arm and transported to the nozzle assembly. The nozzle assembly 90 includes a conical projection that is to be inserted into a teat cup 50 or cleaning cup 60 with the rim of the cup 50, 60 resting on a flange surrounding the projection. Both the conical projection and the flange have nozzles for spraying cleaning fluid into and around the cup 50, 60 to clean both the inside and the outside of the cup. In FIG. 4c, the nozzle assembly 90 is adapted to clean both teat cups 50 and cleaning cups 60. It will be understood, however, that the cleaning cups may have a larger diameter than the teat cups, in which case a separate nozzle assembly 90 would be provided for each type of cup. As for the previous cases illustrated in FIGS. 4a and 4b, the teat cup cleaning using the nozzle assembly 90 will generate a certain amount of spray. Any liquid that settles on the detector window 420 during this cleaning operation would impede the passage of radiation and hence require the cleaning of the detector prior to its next use. In order to avoid this situation, the air curtain is actuated just prior to performing cleaning. The air curtain is deactivated when cleaning is terminated and no further liquid is being released into the air. In the example shown in FIG. 4c, the gripper 120 holds the teat cup 50 or cleaning cup 60 in place during cleaning. However, even if the gripper 120 releases the teat or cleaning cup and moves away from the nozzle assembly 90 prior to cleaning, the spray generated by the nozzle assembly may still settle on the detector window 420, so the air curtain could be generated in this case also.

FIG. 4d shows a last example of a situation when the air curtain may be generated. In this figure, the robot arm 110 has been moved to a position close to the gripper cleaning device 70 with the gripper positioned in front of the spray nozzle. Again, just prior to activating the gripper cleaning device 70, the air curtain is activated to prevent droplets from reaching the detector window 420. After cleaning is terminated, the air curtain is deactivated.

The detector 40 is at risk of contamination not just from dust and droplets in the air but also from urine, mud and manure that may be thrown upwards by the animals' hooves, in part because of its location on the robot arm 110 that is positioned relatively close to the floor at least during operation. The air curtain is less effective at preventing large pieces of dirt from impacting on the window surface 420 and anyway will not be operating for much of the time. For this reason a supplementary cleaning arrangement is provided for cleaning the window 420. To this end, the conduit system 440 and apertures 450 are also used to carry cleaning liquid and/or water for washing the surface of the window 420 when the detector is not in operation. The connector 460 is selectively connected to a source of pressurised air or a source of cleaning liquid or water. When the window 420 is cleaned with cleaning liquid or water, it can subsequently be dried by sending blasts of pressurised air through the apertures. This prevents residue build-up on the window surface 420 that could impede the transmission of radiation over time. The selection of the air or liquid source is controlled by controller 20 as is the switching between these. Alternatively, or in addition, a separate cleaning device may be provided at a location that is close to the robot arm construction, so that the detector may be brought to this cleaning device when cleaning is necessary. This device may use spray nozzles or a sponge or cloth to apply cleaning and possibly rinsing liquid to the window 420 as well as some means for drying or wiping the excess water away. Since the detector housing 410 is at risk of coming into contact with an animal, it can become a source of contamination and must be cleaned as well. Hence, the cleaning device should be capable of cleaning the housing surface as well as the window 420.

It will be understood that other automatic or semi-automatic washing operations carried out on parts of the milking system could also trigger the actuation of the air curtain. This will significantly reduce the frequency of cleaning or the window and possibly also the time needed to clean it.

The invention claimed is:

1. A milking system, comprising:
   a controller (20);
   a milking robot (1) with a robot arm (110) that applies teat cups (50) to the teats of an animal, said controller (20) connected to said milking robot and controlling operation of said milking robot (1); and
   an optical detector (40) that detects radiation from the animal to determine the position of teats of the animal, said controller (20) connected to said optical detector (40) and controlling operation of said optical detector (40),
   said detector having i) a housing (410) with a window (420) that is substantially transparent to said radiation, ii) a detecting element (430) that is enclosed within said housing and receives said radiation through said window (420), and iii) an airflow arrangement (440), said airflow arrangement (440) provided with a connection to a source of pressurized air and having an aperture (450) disposed adjacent the detector window (420) for generating an air curtain that flows across a surface of said detector window (420), wherein,
   said optical detector (40), under control of said controller (20), moves to a position under the animal for detecting a position of the teats of the animal, and
   said controller (20) prevents contamination of the optical detector (40) by controlling application of the pressurized air to said aperture (450) to start generation of the air curtain flowing across the surface of said detector window (420) based on a start of a further operation controlled by the controller.

2. A milking system as claimed in claim 1, wherein,
said aperture (450) disposed adjacent the detector window (420) generates the air curtain flowing substantially parallel with the surface of said detector window (420),
the radiation from the animal detected by the optical detector (40) is one of i) radiation emitted by the animal and ii) radiation reflected by the animal, and
said controller (20) controls the application of the pressurized air to said aperture (450) to start the generation of the air curtain flowing across the surface of said detector window (420) at one of i) the start of the further operation, and ii) shortly before the start of the further operation.

3. A milking system as claimed in claim 1, wherein said further operation controlled by said controller (20) is positioning said optical detector (40) under the animal.

4. A milking system as claimed in claim 1, wherein said further operation controlled by said controller (20) is operation of said optical detector (40) for detecting radiation.

5. A milking system as claimed in claim 1, further comprising:
a washing device (60) for cleaning the teats of the animal,
wherein said further operation controlled by said controller is operating the washing device for cleaning the teats of the animal.

6. A milking system as claimed in claim 1, further comprising:
a teat treatment device (80) for applying a liquid treatment to the teats of the animal,
wherein said further operation controlled by said controller (20) is controlling said teat treatment device to apply the liquid treatment to the teats of the animal.

7. A milking system as claimed in claim 1, wherein said aperture (450) is arranged relative to said detector window (420) such that upon the application of the pressurized air, air flows from said aperture (450) substantially downwards across the surface of said detector window (420).

8. A milking system as claimed in claim 1, wherein said aperture (450) is arranged relative to said detector window (420) such that upon the application of the pressurized air, air flows from said aperture across the surface of said detector window (420) in a direction that is substantially perpendicular to a downwards direction of said detector window (420).

9. A milking system as claimed in claim 1, wherein,
the optical detector (40) is mounted on the robot arm (110), and
the controller (20) controls the robot arm (110) and the optical detector (40) for applying the teat cups (50) to the teats of the animal.

10. A milking system as claimed in claim 1, wherein,
said airflow arrangement (440) is at least partially integrated in said detector housing (410),
said aperture (450) is disposed at an exterior of said detector housing (450) on one side of the window, and
said aperture (450) communicates with a duct system (440) connectible to said source of the pressurized air.

11. A milking system as claimed in claim 10, wherein,
said duct system is further connectible to a source of cleaning liquid, and
said controller controls application of the cleaning liquid to force the cleaning liquid out through said aperture (450) to clean said window (420).

12. A method for preventing contamination of an optical detector (40) used to determine a position of teats of an animal, the method comprising the steps of:
controlling operation of a milking robot (1) with a controller (20) connected to the milking robot, the milking robot (1) having a robot arm (110) that applies teat cups (50) to the teats of the animal;
with the controller (20), controlling operation of an optical detector (40) that detects radiation from the animal to determine the position of teats of the animal,
said detector having i) a housing (410) with a window (420) that is substantially transparent to said radiation, ii) a detecting element (430) that is enclosed within said housing and receives said radiation through said window (420), and iii) an airflow arrangement (440), said airflow arrangement (440) provided with a connection to a source of pressurized air and having an aperture (450) disposed adjacent the detector window (420) for generating an air curtain that flows across a surface of said detector window (420), wherein said controller (20) controls said optical detector (40) to move to a position under the animal for detecting the position of the teats of the animal; and
preventing contamination of the optical detector (40) by said controller (20) controlling application of the pressurized air to said aperture (450) to start generation of the air curtain flowing across the surface of said detector window (420) based on a start of a further operation controlled by the controller.

13. A method as claimed in claim 12, wherein,
said aperture (450) disposed adjacent the detector window (420) generates the air curtain flowing substantially parallel with the surface of said detector window (420),
the radiation from the animal detected by the optical detector (40) is one of i) radiation emitted by the animal and ii) radiation reflected by the animal, and
said controller (20) controls the application of the pressurized air to said aperture (450) to start the generation of the air curtain flowing across the surface of said detector window (420) at one of i) the start of the further operation, and ii) shortly before the start of the further operation.

14. A method as claimed in claim 12, wherein,
said further operation includes movement of said optical detector (40) to the position under the animal when the animal is to be milked,
said controller (20) controls the application of the pressurized air to said aperture (450) to start the generation of the air curtain flowing across the surface of said detector window (420) to coincide with said movement of said optical detector (40), and
subsequent to said movement of said optical detector (40) to the position under the animal, said controller (20) controls moving said optical detector (40) to a position away from under the animal and ceases the application of pressurized air to said aperture (450) at the end of said movement or during the movement of said detector away from under the animal.

15. A method as claimed in claim 12, wherein,
said further operation is spraying treatment liquid towards the teats of the animal, and
controlling the application of the pressurized air to said aperture (450) to generate the air curtain coincides with the spraying of the treatment liquid towards the teats of the animal.

16. A method as claimed in claim 12, wherein,
said further operation is cleaning of the teats of the animal using a teat cleaning device, and
controlling the application of the pressurized air to said aperture (450) to generate the air curtain coincides with the cleaning of the teats of the animal using the teat cleaning device.

17. A method as claimed in claim 12, wherein,
said further operation is application of the teat cups to the teats of the animal, and
controlling the application of the pressurized air to said aperture (450) to generate the air curtain coincides with the application of the teat cups to the teats of the animal.

18. A method as claimed in claim 12, wherein,
said airflow arrangement (440) is connectable to a source of cleaning liquid, and
said method further comprises the step of controlling application of the cleaning fluid to said aperture (450) to effect cleaning of said window (420).

19. A method as claimed in claim 12, wherein,
said aperture (450) disposed adjacent the detector window (420) generates the air curtain flowing substantially parallel with the surface of said detector window (420), and
said controller (20) controls the application of the pressurized air to said aperture (450) to start the generation of the air curtain flowing across the surface of said detector window (420) at the start of the further operation.

20. A method as claimed in claim 12, wherein, wherein said aperture (450) is arranged relative to said detector window (420) such that in said step of controlling the application of the pressurized air, air flows from said aperture (450) substantially downwards and substantially parallel with the surface of said detector window (420).

21. A method as claimed in claim 12, wherein, wherein said aperture (450) is arranged relative to said detector window (420) such that in said step of controlling the application of the pressurized air, air flows from said aperture substantially parallel across the surface of said detector window (420) in a direction that is substantially perpendicular to a downwards direction of said detector window (420).

* * * * *